United States Patent [19]

Okada et al.

[11] Patent Number: 6,005,050

[45] Date of Patent: *Dec. 21, 1999

[54] IMPACT RESISTANT POLYSTYRENE COMPOSITION

[75] Inventors: Akihiko Okada, Ichihara; Nobuyuki Sato, Tokyo; Akitoshi Masuyama, Ichihara, all of Japan

[73] Assignee: Idemitsu Petrochemical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/782,940

[22] Filed: Jan. 13, 1997

Related U.S. Application Data

[63] Continuation of application No. 08/563,039, Nov. 27, 1995, abandoned.

[30] Foreign Application Priority Data

Nov. 28, 1994 [JP] Japan ................................. 6-292668

[51] Int. Cl.⁶ ............................ C08L 25/04; C08L 25/06; C08L 25/08
[52] U.S. Cl. ................................. 525/68; 525/98; 525/99; 525/92 H; 525/191; 525/232; 525/241; 525/397
[58] Field of Search ................................. 525/98, 92 H, 525/397, 68, 99, 191, 232, 241

[56] References Cited

U.S. PATENT DOCUMENTS

| | | | |
|---|---|---|---|
| 3,823,203 | 7/1974 | De La Mare et al. | 525/314 |
| 4,207,359 | 6/1980 | Hannon et al. | 427/195 |
| 4,772,667 | 9/1988 | Biletch et al. | 525/243 |
| 5,089,353 | 2/1992 | Negi et al. | 428/518 |
| 5,109,068 | 4/1992 | Yamasaki et al. | 525/121 |
| 5,127,158 | 7/1992 | Nakano | 29/849 |
| 5,166,238 | 11/1992 | Nakano | 524/120 |
| 5,191,024 | 3/1993 | Shibata et al. | 525/314 |
| 5,200,454 | 4/1993 | Nakano et al. | 524/409 |
| 5,219,940 | 6/1993 | Nakano | 525/133 |
| 5,270,353 | 12/1993 | Nakano et al. | 523/214 |
| 5,278,246 | 1/1994 | Shiraki et al. | 55/301 |
| 5,326,813 | 7/1994 | Okada | 524/508 |
| 5,346,950 | 9/1994 | Negi et al. | 525/57 |
| 5,352,727 | 10/1994 | Okada . | |
| 5,391,603 | 2/1995 | Wessel | 524/396 |
| 5,391,611 | 2/1995 | Funayama et al. | 524/508 |
| 5,418,275 | 5/1995 | Okada | 524/504 |
| 5,436,397 | 7/1995 | Okada . | |
| 5,444,126 | 8/1995 | Okada et al. | 525/391 |
| 5,543,462 | 8/1996 | Okada et al. . | |
| 5,703,164 | 12/1997 | Nakano et al. | 525/133 |
| 5,746,580 | 5/1998 | Natori et al. | 525/100 |
| 5,760,105 | 6/1998 | Okada et al. | 523/201 |
| 5,777,028 | 7/1998 | Okada et al. | 525/86 |
| 5,798,172 | 8/1998 | Funaki et al. | 428/327 |
| 5,891,951 | 4/1999 | Nakana et al. | 524/847 |
| 5,902,850 | 5/1999 | Chino et al. | 524/494 |

FOREIGN PATENT DOCUMENTS 2750515  6/1978  Germany .

*Primary Examiner*—Jeffrey Mullis
*Attorney, Agent, or Firm*—Oblon, Spivak, McClelland, Maier & Neustadt, P.C.

[57] ABSTRACT

There is disclosed an impact resistant polystyrene composition which comprises 5 to 98% by weight of an (a) styrenic polymer having a syndiotactic configuration and 2 to 95% by weight of a (b) styrene/diolefin diblock copolymer, styrene/diolefin/styrene triblock copolymer or styrene/diolefin random compolymer, each having a hydrogenation rate of 70 to 98 mol %, and optionally a (c) rubbery elastomer having an olefinic component or polyolefin, a (d) poly(phenylene ether), etc. The above composition is greatly enhanced in its impact resistance and elongation properties without deterioration of heat resistant stability of color tone, etc.

11 Claims, No Drawings

IMPACT RESISTANT POLYSTYRENE COMPOSITION

This application is a Continuation of application Ser. No. 08/563,039, filed on Nov. 27, 1995, now abandoned.

BACKGROUND OF THE INVENTION

1. Field of the Invention

The present invention relates to an impact resistant syndiotactic polystyrene composition which is well suited for molding electric and electronic materials such as connectors and print-circuit board; industrial construction materials; automobile parts such as connectors to be mounted on vehicles, wheel cap and cylinder head cover; domestic electrical appliances; various machine parts; and industrial materials such as pipes, sheets, trays and films.

2. Description of Related Arts

A styrenic polymer having syndiotactic configuration (hereinafter sometimes abbreviated as SPS) is excellent in heat resistance and chemical resistance but is poor in impact resistance and therefore, it has heretofore been limited in the scope of application usable as a construction material. In order to solve the problem, improvements have been made on the impact resistance of SPS, for example, by blending a rubbery elastomer and/or other thermoplastic resin with SPS. (Refer to, for example, Japanese Patent Application Laid-Open Nos. 257950/1987, 146944/1989, 182344/1989, 279944/1989 and 64140/1990.)

For example, there are available SPS containing a styrenic compound as a component and as a rubbery elastomer (refer to Japanese Patent Application Laid-Open No. 146944/1989), a SPS/rubber composition incorporated with a block or graft copolymer containing atactic polystyrene chain as a compatibilizer (refer to Japanese Patent Application Laid-Open No. 279944/1989), and the like.

However, since there is used in the above-mentioned improved technique, a rubbery component or a block or graft copolymer containing atactic polystyrene chain as a compatibilizer for the purpose of improving the compatibility between SPS and the rubbery component that are incompatible with each other and enhancing the dispersibility and interfacial strength of the rubbery component, the problem still remains unsolved in that the working effect as the compatibilizer and the enhancement of impact resistance have still been insufficient. Although the use of a styrene/diolefin-based copolymer, for example, improves the toughness of SPS, the problem still remains unsolved in regard to heat resistant stability by reason of the presence of a double bond. The use of a hydrogenated styrene/diolefin copolymer rubber results in insufficient compatibility with SPS and also in insufficient improvement on toughness in spite of improved heat resistant stability. On the other hand, in the case of adding a large amount of a poly(phenylene ether) for the purpose of enhancing the impact resistance, the addition thereof inevitably brings about the deterioration of the resultant composition with respect to the hue and long-term heat resistance as well as the decrease in the crystallinity of the SPS.

SUMMARY OF THE INVENTION

In view of the above, intensive research and investigation were continued by the present inventors in order to solve the above-mentioned problems. As a result, it has been found that there is obtained a syndiotactic polystyrene compositon which is remarkably improved in impact resistance as well as elongation property without impairing heat resistant stability by blending, with SPS, as a rubber component or a compatibilizer, a styrene/diolefin diblock copolymer, or a styrene/diolefin/styrene triblock copolymer or a styrene/diolefin random copolymer, each copolymer having a hydrogenation rate in the range of 70 to 98 mol %. The present invention has been accomplished on the basis of the above-mentioned finding and information.

Specifically, the present invention provides an impact resistant polystyrene composition which comprises 5 to 98% by weight of an (a) styrenic polymer having a syndiotactic configuration and 2 to 95% by weight of a (b) copolymer selected from the group consisting of a styrene/diolefin diblock copolymer, a styrene/diolefin/styrene triblock copolymer and a styrene/diolefin random copolymer, said copolymers each having a hydrogenation rate in the range of 70 to 98 mol %. It also provides an impact resistant polystyrene composition which comprises 5 to 98% by weight of an (a) styrenic polymer having a syndiotactic configuration, a (b) copolymer selected from the group consisting of a styrene/diolefin diblock copolymer, a styrene/diolefin/styrene triblock copolymer and a styrene/diolefin random copolymer, said copolymers each having a hydrogenation rate in the range of 70 to 98 mol %, and a (C) member selected from the group consisting of a rubbery elastomer and polyolefin, the total amount of the component (b) and the component (c) being 2 to 95% by weight.

DESCRIPTION OF PREFERRED EMBODIMENT

In the impact resistant polystyrene composition according to the present invnetion, a styrenic polymer having a syndiotactic configuration which constitutes the component (a) is employed as the matrix.

Here, the syndiotactic configuration in the styrenic polymer which has a syndiotactic configuration means that its stereochemical structure is of syndiotactic configuration, i.e., the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrenic polymers having such syndiotactic configuration as mentioned in the present invention usually means polystyrene, poly(alkylstyrene), poly(halogenated styrene), poly(halogenated alkylstyrene), poly(alkoxystyrene), poly(vinyl benzoate), hydrogenated polymer thereof, the mixture thereof, and copolymers containing the above polymers as main components, having such a syndiotacticity as determined by the above-mentioned method that the proportion of recemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene), poly(phenylstyrene), poly(vinylnaphthalene) and poly(vinylstyrene). Poly(halogenated styrene) includes poly(chlorostyrene), poly(bromostyrene), and poly(fluorostyrene). Poly(halogenated alkylstyrene) includes poly(chloromethylstyrene). Poly(alkoxystyrene) includes poly(methoxystyrene), and poly(ethoxystyrene).

The particularly desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene and the copolymer containing the structural units thereof.

The above-mentioned styrenic polymer may be used alone or in combination with at least one other.

The molecular weight of the styrenic polymer to be used in the present invention is not specifically limited, but is desirably 10,000 or more, more desirably 50,000 or more in terms of weight-average molecular weight. The molecular-weight distribution, that is, the broadening of molecular weight of the styrenic polymer is not specifically limited as well, but may be in a wide range. A weight-average molecular weight of less than 10,000 is unfavorable since the composition or a molding obtained therefrom is sometimes deteriorated thereby in the thermal and mechanical properties.

The styrenic polymer having such syndiotactic configuration can be produced by polymerizing a styrenic monomer which corresponds to the above styrenic polymer in the presence or absence of a solvent such as an inert hydrocarbon by the use of a catalyst comprising a titanium compound and a condensation product of water and trialkylaluminum (Japanese Patent Application Laid-Open No., 187708/1987). In addition, the poly(halogenated alkylstyrene) and the hydrogenated product thereof can be produced by the processes described in Japanese Patent Application Laid-Open Nos. 46912/1989 and 178505/1989, respectively.

The component (b), which is a styrene/diolefin diblock copolymer, or a styrene/diolefin/styrene triblock copolymer, or a styrene/diolefin random copolymer, each copolymer having a hydrogenation rate of 70 to 98 mol %, is incorporated for the purpose of obtaining a resin composition imparted with both toughness and heat resistant stability. It is thought that the improvement in toughness and heat resistant stability of the resin composition is attributable to the fact that the compatibility or affinity between the component (a) and the component (b) or between the component (a) and the combination of the components (b) and (c) is remarkably improved by the double bond remaining to some extent in the component (b) as compared with a styrene/diolefin-based copolymer in which the original double bond is completely hydrogenated.

The hydrogenation rate in the component (b) is preferably 70 to 98 mol %, more preferably 75 to 95 mol % per 100 mol % of the double bond in a styrene/diolefin-based copolymer as a starting raw material for the component (b). A hydrogenation rate less than 70 mol % unfavorably results in deterioration of heat resistant stability, whereas that more than 98 mol % leads to little effect on the improvement of toughness.

Specific examples of the component (b) include a copolymer obtained by hydrogenating, in a hydrogenation rate of 70 to 98 mol %, a styrene/diolefin-based block, graft or random copolymer such as styrene/butadiene diblock copolymer (SBR), styrene/butadiene/styrene triblock copolymer (SBS), styrene/butadiene random copolymer (SB), styrene/isoprene diblock copolymer (SIR), styrene/isoprene/styrene triblock copolymer (SIS) and styrene/isoprene random copolymer (SI). Of these, is preferably usable the copolymer which is obtained by hydrogenating styrene/butadine/styrene triblock copolymer (SBS) within the range of 70 to 98 mol %.

With regard to the blending ratios of the components (a) and (b), the component (a) is blended in a ratio of 5 to 98% by weight, and the component (b) is blended in a ratio of 2 to 95% by weight. A blending ratio of the component (b) less than 2% by weight results in little effect on the improvement of impact resistance, whereas that more than 95% by weight sometimes brings about remarkable deterioration of modulus of elasticity and heat resistance of the objective polystyrene composition. Thus, the component (b) is blended preferably in the range of 5 to 90% by weight. Within the above-mentioned range, the effect on the improvement of impact resistance, excellent modulus of elasticity and excellent heat resistance of the composition are attained.

In addition, there is preferably usable an olefinic segment of the component (b) which has a skeleton same as that of or favorable compatibility with a rubbery elastomer having an olefinic component or a polyolefin each as the component (c) hereinafter described.

The resin composition according to the present invention may further comprise, as the component (c), a rubbery elastomer containing an olefinic component or a polyolefin. The component (c) is used for the purpose of improving the impact resistance of the resin composition according to the present invention.

Such rubbery elastomer or polyolefin contains, as a monomer unit in its structure, an olefinic component such as ethylene, propylene, butylene, octene, butadiene, isoprene, norbornene, norbornadiene and cyclopentadiene. Specific examples of such rubbery elastomer include natural rubber; polybutadiene; polyisoprene; polyisobutylene neoprene; styrene/butadiene block copolymer (SBR); a styrene/butadiene/styrene block copolymer (SBS); hydrogenated styrene/butadiene/styrene block copolymer (SEBS); styrene/isoprene block/styrene block copolymer (SIS); hydrogenated styrene/isoprene block/styrene block copolymer (SEPS); ethylene/propylene rubber (EPM); ethylene/propylene/diene rubber (EPDM); and a rubber formed by modifying any of the foregoing with a modifying agent. Preferable rubbery elastomers among these are SEBS, SBR, SBS, EPM and EPDM.

Specific examples of the polyolefin include isotactic polypropylene, syndiotactic polypropylene, atactic polypropylene, block polypropylene, random polypropylene, high density polyethylene, high pressure processed polyethylene, linear low-density polyethylene, cyclic polyolefin, polybutene, 1,2-polybutadiene and a copolymer of the foregoing.

The above-exemplified rubbery elastomer or polyolefin may be used alone or in combination with at least one other.

The rubbery elastomer or the polyolefin to be used as the component (c) is blended in the composition so that the total amount of the components (b) and (c) is in the range of 2 to 95%, preferably 5 to 90% by weight in 100% by weight of the resin composition. A total amount thereof less than 2% by weight results in little effect on the improvement of impact resistance, whereas that more than 95% by weight sometimes unfavorably brings about remarkable deterioration of modulus of elasticity as well as heat resistance of the composition. The total amount of the components (b) and (c) in the range of 5 to 90% by weight is preferable, since the impact resistance of the composition is markedly improved without impairing the modulus of elasticity and heat resistance of the composition within this range. The ratio of the component (b) to the component (c), that is, (b)/(c) is not specifically limited, but is preferably at least 1/99. A ratio thereof less than 1/99 often unfavorably lessens the effect on the improvement of toughness of the composition.

The resin composition according to the present invention may further comprise poly(phenylene ether) as the component (d). The poly(phenylene ether) is a publicly known compound, and reference may be made to U.S. Pat. Nos. 3,306,874, 3,306,875, 3,257,357 and 3,257,358. The poly (phenylene ether) is prepared usually by oxidative coupling reaction forming a homopolymer or a copolymer in the presence of a cupramine complex and at least one di- or tri-substituted phenol. As the cupramine complex there may be used the cupramine complex derived from any of primary, secondary and tertiary amines.

Specific examples of the suitable poly(phenylene ether) include
poly(2,3-dimethyl-6-ethyl-1,4-phenylene ether),
poly(2-methyl-6-chloromethyl-1,4-phenylene ether),
poly(2-methyl-6-hydroxyethyl-1,4-phenylene ether),
poly(2-methyl-6-n-butyl-1,4-phenylene ether),
poly(2-ethyl-6-isopropyl-1,4-phenylene ether),
poly(2-ethyl-6-n-propyl-1,4-phenylene ether),
poly(2,3,6-trimethyl-1,4-phenylene ether),
poly[2-(4'-methylphenyl)-1,4-phenylene ether],
poly(2-bromo-6-phenyl-1,4-phenylene ether),
poly(2-methyl-6-phenyl-1,4-phenylene ether),
poly(2-phenyl-1,4-phenylene ether),
poly(2-chloro-1,4-phenylene ether),
poly(2-methyl-1,4-phenylene ether),
poly(2-chloro-6-ethyl-1,4-phenylene ether),
poly(2-chloro-6-bromo-1,4-phenylene ether),
poly(2,6-di-n-propyl-1,4-phenylene ether),
poly(2-methyl-6-isopropyl-1,4-phenylene ether),
poly(2-chloro-6-methyl-1,4-phenylene ether),
poly(2-methyl-6-ethyl-1,4-phenylene ether),
poly(2,6-dibromo-1,4-phenylene ether),
poly(2,6-dichloro-1,4-phenylene ether),
poly(2,6-diethyl-1,4-phenylene ether) and poly(2,6-dimethyl-1,4-phenylene ether).

There is also suitably used the copolymer such as a copolymer derived from at least two phenolic compounds that are employed for the preparation of the above-mentioned polymer. Mention is also made, for example, of a graft copolymer or a block copolymer of a vinyl aromatic compound such as polystyrene and the above-exemplified poly(phenylene ether). Among the above-mentioned poly (phenylene ether), poly(2,6-dimethyl-1,4-phenylene ether) is particularly desirable for use.

The above-mentioned poly(phenylene ether) may be used alone or in combination with at least one other.

The molecular weight of the component (d) is not specifically limited, but is preferably at least 0.4 dL(deciliter)/g more preferably at least 0.5 dL/g expressed in terms of intrinsic viscosity as measured in chloroform at 25° C. An intrinsic viscosity thereof less than 0.4 dL/g sometimes unfavorably lessens the effect on the improvement of impact resistance of the composition.

In the resin composition in which the component (d) is incorporated therein, the blending ratios of the component (a), the total of the component (b) and (c) and the component (d) are set to 5 to 98% by weight, 1 to 90% by weight and 0.5 to 5.0% by weight, respectively. A blending ratio of the component (d) less than 0.5% by weight results in little effect on the improvement of impact resistance, whereas that more than 5.0% by weight sometimes unfavorably brings out deterioration of moldability of the resultant composition. The blending ratio of the component (d) in the range of 1.0 to 5.0% by weight is preferable, since the impact resistance of the present composition is markedly improved and the moldability thereof is made excellent within this range.

The resin composition according to the present invention may further be blended, when necessary, with an inorganic filler for the purpose of enhancing rigidity and heat resistance of the present composition.

As the inorganic filler, mention may be made of various fillers such as fibrous fillers, granular fillers and powdery fillers. Examples of fibrous fillers include glass fiber, carbon fiber, whisker, kevlar fiber, ceramics fiber and metallic fiber. Specific examples of the filler include boron; alumina; silica; and silicon carbide as whisker, gypsum; potassium titanate; magnesium sulfate; and magnesium oxide as ceramics fiber, copper; aluminum; and steel as metallic fiber. The form or shape of the filler includes cloth, mat, bound and cut fiber, short fiber, filament and whisker. The bound and cut fiber has preferably a length of 0.05 to 50 mm and a diameter of 5 to 20 $\mu$m. The cloth fiber and mat fiber have preferably a length of at least one (1) mm, particularly at least 5 mm.

Examples of granular or powdery filler include talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, metallic powder, glass powder, glass flake and glass bead. Among the above-mentioned fillers are preferable in particular the glass fillers such as glass filament, glass fiber, glass roving, glass mat, glass powder, glass flake and glass beads.

The above-mentioned inorganic filler is preferably surface-treated. The purpose of use of the coupling agent to be used for the surface treatment is to improve the adhesivity between the filler and the resin component. The coupling agent may optionally be selected for use from the publicly known silane-based coupling agent and titanium-based coupling agent. Examples of the silane-based coupling agent include
triethoxysilane, vinyltris($\beta$-methoxyethoxy)silane,
$\gamma$-methacryloxypropyl-trimethoxysilane,
$\gamma$-glycidoxypropyl-trimethoxysilane,
$\beta$-(1,1-epoxycyclohexyl)ethyl-trimethoxysilane,
N-$\beta$-(aminoethyl)-$\gamma$-aminopropyl-trimethoxysilane,
N-$\beta$-(aminoethyl)-$\gamma$-aminopropyl-methyldimethoxysilane,
$\gamma$-aminopropyl-triethoxysilane,
N-phenyl-$\gamma$-aminopropyl-trimethoxysilane,
$\gamma$-mercaptopropyl-trimethoxysilane,
$\gamma$-chloropropyl-trimethoxysilane,
$\gamma$-aminopropyl-trimethoxysilane,
$\gamma$-aminopropyl-tris(2-methoxyethoxy)silane,
N-methyl-$\gamma$-aminopropyl-trimethoxysilane,
N-vinylbenzyl-$\gamma$-aminopropyl-triethoxysilane,
triaminopropyl-trimethoxysilane,
3-ureidopropyl-trimethoxysilane,
3-(4,5-dihydroimidazole)propyl-triethoxysilane,
hexamethyldisilazane,
N,O-(bistrimethylsilyl)amide and N,N-bis(trimethylsilyl) urea.

Among them are desirable aminosilane and epoxysilane such as $\gamma$-aminopropyl-triethoxysilane, N-$\beta$-(aminoethyl)-$\gamma$-aminopropoyl-triethoxysilane, $\gamma$-glycidoxypropyltrimethoxysilane, $\beta$-(3,4-epoxycyclohexyl)ethyltrimethoxysilane.

Specific examples of the titanium-based coupling agent include isopropyltriisostearoyl titanate, isopropyltridodecylbenzenesulfonyl titanate, isopropyltris (dioctylpyrophosphate)titanate, tetraisopropylbis (dioctylphosphite)titanate, tetraoctylbis(di-tridecylphosphite)titanate, tetra(1,1-diallyloxymethyl-1-butyl)bis(di-tridecyl)phosphite titanate, bis (dioctylpyrophosphate)oxyacetate titanate, bis (dioctylpyrophosphate)ethylene titanate, isopropyltrioctanoyl titanate, isopropyldimethacrylisostearoyl titanate, isopropylisostearoyldiacrylate titanate, isopropyltri(dioctylphosphate)titanate, isopropyltricumylphenyl titanate, isopropyltri(N-amidoethyl-aminoethyl)titanate, dicumylphenyloxyacetate titanate and di-isostearoyl-ethylene titanate, among which isopropyltri (N-amidoethyl-aminoethyl)titanate is desirable.

The surface treatment of the above-mentioned filler by the use of such coupling agent can be effected by a conventional known method without specific limitation, for example, sizing treatment in which the filler is coated with the sizing agent in the form of solution of the coupling agent as mentioned above in an organic solvent or in the form of suspension containing the coupling agent; dry blending by the use of a Henschel mixer, super mixer, Ready-gel mixer, V-type blender or the like; spraying method; integral blending; dry concentration or the like, each being suitably selected according to the form and shape of the filler to be used. The surface treatment is, however, preferably carried out by means of sizing treatment, dry blending, spraying or the like.

In combination with the aforementioned coupling agent, a film-forming substance for glass may be used without specific limitation and is exemplified by the polymer such as polyester-based, urethane-based, epoxy-based, acrylics-based and vinyl acetate-based polymers.

In the case of blending an inorganic filler in the present composition, the blending ratio thereof is set to 0.5 to 350 parts by weight based on 100 parts by weight of the present resin composition comprising the component (a) and the component (b), and optionally, the component (c) and further optionally, the component (d). A blending ratio thereof less than 0.5 part by weight results in that the blending effect of the filler is not sufficiently recognized, whereas that more than 350 parts by weight sometimes brings about such disadvantages as poor dispersibility of the filler and difficulty in the molding of the present composition. It is preferable that the blending ratio thereof be set in the range of 5 to 200 parts by weight from the viewpoints of working effect as a filler, dispersibility of the filler and moldability of the present composition.

The resin composition of the present invention may be blended, when necessary as the component (f), with a polymer having compatibility with or affinity for the above-described component (a) and further containing a polar group. Such a polymer is imparted with the function of enhancing the adhesivity of the inorganic filler onto the resin. Here, the polymer having compatibility with or affinity for the component (a) and further containing a polar group is a polymer which contains in its chain, a chain exhibiting compatibility with or affinity for the component (a), and is exemplified by a polymer containing syndiotactic polystyrene, atactic polystyrene, isotactic polystyrene, styrenic polymer, poly(phenylene ether), poly(vinyl ethyl ether) or the like as its main chain, block chain or graft chain.

The polar group as mentioned above need only be a polar group which enhances the adhesivity to the above-mentioned inorganic filler and specifically exemplified by a group of any of acid anhydride, carboxylic acid, carboxylic acid ester, carboxylic acid halide, carboxylic acid amide, carboxylate, sulfonic acid, sulfonic acid ester, sulfonic acid chloride, sulfonic acid amide and sulfonate, epoxy group, amino group, imide group and oxazoline group.

Specific examples of the component (f) include styrene/maleic anhydride copolymer(SMA), styrene/glycidyl methacrylate copolymer, carboxylic acid end-modified polystyrene, epoxy group end-modified polystyrene, oxazoline end-modified polystyrene, amine end-modified polystyrene, sulfonated polystyrene, styrenic ionomer, styrene/methyl methacrylate graft copolymer, (styrene/glycidyl methacrylate)/methyl methacrylate graft copolymer, acid modified acrylate/styrene graft copolymer, (styrene/glycidyl methacrylate)/styrene graft copolymer, polybutylene terephthalate/polystyrene graft copolymer, modified styrenic polymer such as maleic anhydride modified SPS, fumaric acid modified SPS, glycidyl methacrylate modified SPS and amine-modified SPS, and modified poly (phenylene ether) such as (styrene/maleic anhydride)/poly (phenylene ether) graft copolymer, maleic anhydride modified poly(phenylene ether), fumaric acid modified poly (phenylene ether), glycidyl methacrylate modified poly (phenylene ether) and amine modified poly(phenylene ether). Of these, modified SPS and modified poly(phenylene ether) are particularly preferable.

The above-mentioned polymer may be used alone or in combination with at least one other.

The aforesaid modified styrenic polymer and modified poly(phenylene ether) can be produced by modifying any of various styrenic polymers and poly(phenylene ether) by the use of a modifying agent. However, the production process is not limited to this process insofar as the modified product is usable for the object of the present invention.

In the case of preparing modified SPS, the polymer as exemplified as the component (a) may be used as the starting SPS without specific limitation. There is preferably used however, a styrene/substituted styrene copolymer from the standpoint of compatibility with the SPS as the component (a). The constitution of the copolymer is not specifically limited, but the proportion of the substituted styrene is preferably 1 to 50 mol %. A proportion thereof less than 1 mol % causes difficulty in modification, whereas that more than 50 mol % results in unfavorable deterioration of compatibility with SPS.

Examples of particularly preferable comonomer include alkylstyrenes such as methylstyrene, ethylstyrene, isopropylstyrene, tert-butylstyrene and vinylstyrene; halogenated styrenes such as chlorostyrene, bromostyrene and fluorostyrene; halogenated alkylstyrenes such as chloromethylstyrene; and alkoxystyrenes such as methoxystyrene and ethoxystyrene.

As the modifying agent used for modifying the poly (phenylene ether) or SPS, there is used a compound having an ethylenic double bond and a polar group in the same molecule, which is specifically exemplified by maleic anhydride, maleic acid, maleic acid ester, maleimide, N-substituted compound thereof, maleic acid derivatives typified by maleic acid salt, fumaric acid, fumaric acid ester, fumaric acid derivatives typified by fumaric acid salt, itaconic acid, itaconic acid ester, itaconic acid derivatives typified by itaconic acid salt, acrylic acid, acrylic acid ester, acrylic acid amide, acrylic acid derivatives typified by acrylic acid salt, methacrylic acid, methacrylic acid ester, methacrylic acid amide, methacrylic acid salt and methacrylic acid derivatives typified by glycidyl methacrylate, among which are preferably used maleic anhydride, fumaric acid, and glycidyl methacrylate in particular.

The modified SPS is obtained, for example, by reacting the above-mentioned starting SPS with a modifying agent in the presence of a solvent or an other resin. There are available publicly known methods such as a method wherein the SPS and the modifying agent are melt kneaded at a temperature in the range of 150 to 300° C. to proceed with reaction by the use of a roll mill, Banbury mixer, extruder or the like, and a method in which the aforesaid components are reacted with heating in a solvent such as benzene, toluene, xylene or the like. In order to readily proceed with the reaction, it is effective to allow a radical generating agent to be present in the reaction-system which is exemplified by benzoyl peroxide, di-tert-butyl peroxide, dicumyl peroxide, tert-butyl peroxybenzoate, azobis(isobutyronitrile), azobis (isovaleronitrile) and 2,3-diphenyl-2,3-dimethylbutane. A preferable method is a method by melt kneading in the presence of a radical generating agent. Moreover, an other resin may be added at the time of modifying. Among these modified SPS, there are particularly preferably used maleic acid anhydride modified SPS and fumaric acid modified SPS.

The modified poly(phenylene ether) is obtained in the same manner as the modified SPS by the use of poly (phenylene ether) as the starting material, for which those described as the component (d) can be used. As an example, any of the poly(phenylene ether) described as the component (d) can be modified by using the aforesaid modifying agent by the process exactly the same as the process for the modified SPS. Among the modified poly(phenylene ether), there are particularly preferably used maleic anhydride modified poly(phenylene ether) and fumaric acid modified poly(phenylene ether).

The content of the polar group in the polymer as the component (f) which has compatibility with or affinity for the component (a) and further contains a polar group is preferably in the range of 0.01 to 20% by weight, more preferably 0.05 to 10% by weight based on the polymer. A content thereof less than 0.01% by weight brings about the necessity for adding a large amount of the polymer in order to exert the effect on the adhesion to the inorganic filler, thereby unfavorably deteriorating the dynamical properties, heat resistance and moldability of the resulting composition, whereas that more than 20% by weight often causes unfavorable deterioration of the compatibility with the component (a).

The blending ratio of the component (f) is in the range of preferably 0.1 to 10, more preferably 0.5 to 8 parts by weight based on 100 parts by weight of the present resin composition comprising the component (a) and the component (b), and optionally, the component (c), and further optionally, the component (d). A blending ratio thereof less than 0.1 part by weight results in little effect on adhesivity to the inorganic filler and insufficient adhesivity between the resin and the inorganic filler, whereas that more than 10 parts by weight unfavorably causes deterioration of the crystallizability of the component (a) as well as remarkable deterioration of the heat resistance and moldability of the resultant composition. A blending ratio thereof in the range of 0.5 to 8 parts by weight enhances the effect on adhesivity to the inorganic filler without impairing the characteristics of the component (a).

The composition according to the present invention may be incorporated as necessary with an additive such as a nucleating agent, an antioxidant, a ultraviolet absorber, an external lubricant, a plasticizer, an antistatic agent, a colorant, a flame retardant and a flame retardant aid or another thermoplastic resin insofar as the object of the present invention is not impaired.

The nucleating agent can be arbitrarily selected for use from among the publicly known species that are exemplified by a metallic salt of a carboxylic acid such as aluminum p-tert-butylbenzoate, a metallic salt of phosphoric acid such as sodium phosphate of methylenebis(2,4-di-tert-butylphenol)acid, talc, phthalocyanine derivatives and the like. The nucleating agent may be used alone or in combination with at least one other.

The plasticizer can be arbitrarily selected for use from among the publicly known species that are exemplified by polyethylene glycol, polyamide oligomer, ethylenebisstearamide, phthalic acid ester, polystyrene oligomer, polyethylene wax, mineral oil, silicone oil, and the like. The plasticizer may be used alone or in combination with at least one other.

The flame retardant and flame retardant aid can be arbitrarily selected from among the publicly known species that are exemplified by brominated polystyrene, brominated syndiotactic polystyrene, brominated poly(phenylene ether), etc. as flame retardant, and antimony compounds such as antimony trioxide, etc. as flame retardant aid. Any of them may be used alone or in combination with at least one other.

Examples of the usable antioxidant include (2,6-di-tert-butyl-4-methylphenyl)pentaerythritol diphosphate (produced by Adeka Argus Co., Ltd. under the trademark "PEP-36") and tetrakis[-methylene-3-(3',5'-di-tert-butyl-4'-hydroxyphenyl)]propionate (produced by Adeka Argus Co., Ltd. under the trademark "MARK" A060").

The antioxidant may be used alone or in combination with at least one other one.

The present composition is prepared by compounding and blending each of the aforesaid indispensable components and any one of the additive components to be used when desired.

As a method of blending, there may be optionally adoptable melt kneading method, solution blending method and the like method, each being a conventional known method. As a method of blending the inorganic filler which has been treated with the coupling agent, there may be adoptable, in addition to the aforesaid methods, a method in which a sheet composed of the component (a) or a composition containing the same is laminated with glass mat, followed by melting, a method in which the component (a) or a composition containing the same and a long fiber type inorganic filler are mixed in a liquid to form a slurry, followed by precipitation and heating and the like method. In general, ordinary melt kneading by means of a Banbury mixer, Henschel mixer, kneading roll or the like is preferable.

As described hereinbefore, the impact resistant polystyrene composition is excellent in impact resistance and can provide molded products imparted with excellent physical properties without imparing the heat resistant stability inherent in SPS, irrespective of the molding method applied thereto. Accordingly, the impact resistant polystyrene composition is expected to find effective use for the production of various moldings by injection molding, sheets films, etc. by extrusion molding, containers, trays, etc. by extrusion molding and thermoforming, uniaxially or biaxially oriented films, sheets, etc. by extrusim molding and orientation, fibrous moldings by spinning method and the like molded products.

In the following, the present invention will be described in more detail with reference to preparation example, examples and comparative examples.

PREPARATION EXAMPLE 1

In a 2 L (liter) reaction vessel were placed 1.0 L of purified styrene, 1 mmol of triethylaluminum and after heating to 80° C., 16.5 ml of a premixed catalyst comprising 90 μmol of pentamethylcyclopentadienyltitanium trimethoxide, 90 μmol of dimethylaniliniumtetra (pentafluorophenyl) borate, 29.1 mmol of toluene and 1.8 mmol of triisobutylaluminum, which were then subjected to polymerization reaction at 80° C. for 5 hours.

After the completion of the reaction, the reaction product was washed with methanol repeatedly and dried to afford 380 g of polymer. As the result of analysis by gel permeation chromatography using 1,2,4-trichlorobenzene at 130° C. as the solvent, the polymer thus produced had a weight-average molecular weight of 320,000 and a ratio of weight-average molecular weight to number-average molecular weight of 2.60.

It was confirmed that the polymer was polystyrene having syndiotactic configuration(SPS) from the results of melting point measurement and $^{13}$C-NMR analysis using carbon isotope.

PREPARATION EXAMPLE 2

In a 2 L reaction vessel were placed 0.9 L of purified styrene, 0.1 L of p-methylstyrene, 1 mmol of triethylaluminum, and after heating to 80° C., 16.5 ml of a premixed catalyst comprising 90 μmol of pentamethylcyclopentadienyltitanium trimethoxide, 90 μmol of dimethylamiliniumtetea(pentafluorophenyl)borate, 29.1 mmol of toluene and 1.8 mmol of triisobutylaluminum which were then subjected to polymerization reaction at 80° C. for 5 hours.

After the completion of the reaction, the reaction product was washed with methanol repeatedly and dried to afford 390 g of polymer. As the result of analysis by gel permeation chromatography using 1,2,4-trichlorobenzene at 130° C. as the solvent, the polymer thus produced had a weight-average molecular weight of 328,000 and a ratio of weight-average molecular weight to number-average molecular weight of 2.60.

It was confirmed that the polymer was polystyrene having syndiotactic configuration(SPS) and p-methylstyrene unit content of 12 mol % from the results of melting point measurement and $^{13}$C-NMR analysis using carbon isotope.

PREPARATION EXAMPLE 3

One (1) kg of styrene/p-methylstyrene copolymer (p-methylstyrene unit content of 12 mol %) produced in Preparation Example 2, 30 g of maleic anhydride, and 10 g of 2,3-dimethyl-2,3-diphenylbutane (produced by Nippon Oil & Fat Co., Ltd. under the tradename "NOPHMER") as a radical generating agent were dry-blended and melt kneaded by the use of a 30 mm twin-screw extruder at a revolution of 200 rpm at a temperature set to 300° C., while the resin temperature was about 330° C. The resultant strand was cooled and then pelletized to produce maleic anhydride modified SPS. One (1) g of the resultant modified SPS was dissolved in ethylbenzene and then reprecipitated in methanol, and the recovered polymer was subjected to Soxhlet extraction and dried. Thereafter, the modification efficiency was detrmined from the intensity of carbonyl absorption in infrared (IR) absorption spectrum and titration. As a result, the modification efficiency was 1.05% by weight.

PREPARATION EXAMPLE 4

One (1) kg of poly(phenylene ether) (intrinsic viscosity of 0.45 dL/g in chloroform at 25° C.), 60 g of maleic anhydride, and 10 g of 2,3-dimethyl-2,3-diphenylbutane (produced by Nippon Oil & Fat Co., Ltd. under the tradename "NOPHMER") as a radical generating agent were dry-blended and melt kneaded by the use of a 30 mm twin-screw extruder at a revolution of 200 rpm at a temperature set to 300° C., while the resin temperature was about 330° C. The resultant strand was cooled and then pelletized to produce maleic anhydride-modified poly(phenylene ether). One (1) g of the resultant modified poly(phenylene ether) was dissolved in ethylbenzene and then reprecipitated in methanol, and the recovered polymer was subjected to Soxhlet extraction and dried. Thereafter, the modification efficiency was determined from the intensity of carbonyl absorption in infrared (IR) absorption spectrum and titration. As a result, the modification efficiency was 2.0% by weight.

EXAMPLE 1

To 100 parts by weight of the mixture comprising 80% by weight of SPS which had been produced in Preparation Example 1 (weight-average molecular weight of 320,000, weight-average molecular weight Mw/number-average molecular weight Mn of 2.60) as the component (a), 20% by weight of SEBS with a hydrogenation rate of 75 mol % (produced by Kuraray Co., Ltd. under the tradename "Septon KL-8006", reduced in hydrogenation rate) as the component (b) were added 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis[methylene-3-(3',5'-di-tert-butyl-4'-hydroxyphenyl)] propionate (produced by Adeka Argus Co., Ltd. under the tradename "MARK A060") also as an antioxidant, and the resultant mixture was dry-blended with a Henschel mixer. Subsequently the blend was melt kneaded and pelletized with a twin-screw extruder. The pellet thus obtained was injection molded to produce test pieces for Izod impact test. Measurements were made of Izod impact strength according to JIS-K-7110 before and after heat resistance test (120° C., 500 hours) and change in color tone of the test pieces thus obtained. The results are given in Table 1. The change in color tone was numerically evaluated with integers from 10 to 1 by marking 10 for the best in the order of decreasing number for the worse.

EXAMPLES 2 & 3 AND COMPARATIVE EXAMPLES 1 TO 3

The procedure in Example 1 was repeated except that the component (b) was altered as given in Table 1. The results are given in Table 1.

EXAMPLE 4

To 100 parts by weight of the mixture comprising 80% by weight of SPS which had been produced in Preparation Example 1 (weight-average molecular weight of 320,000, weight-average molecular weight Mw/number-average molecular weight Mn of 2.60) as the component (a), 4% by weight of SEBS with a hydrogenation rate of 75 mol % (produced by Kuraray Co., Ltd. under the tradename "Septon KL-8006", reduced in hydrogenation rate) as the component (b) and 16% by weight of styrene/butadiene/styrene hydrogenated copolymer (produced by Shell Kagaku K. K. under the tradename "Kraton G-1651") as the component (c) were added 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis[methylene-3-(3',5'-di-tert-butyl-4'-hydroxyphenyl)]propionate (produced by Adeka Argus Co., Ltd. under the tradename "MARK A060") also as an antioxidant, and the resultant mixture was dry-blended with a Henschel mixer. Subsequently the blend was melt kneaded and pelletized with a twin-screw extruder. The pellet thus obtained was injection molded to produce test pieces for Izod impact test. Measurements were made of Izod impact strength according to JIS-K-7110 before and after heat resistance test (120° C., 500 hours) and change in color tone of the test pieces thus obtained. The results are given in Table 1.

EXAMPLES 5 TO 8 AND COMPARATIVE EXAMPLES 4 TO 8

The procedure in Example 4 was repeated except that the component (b) and the component (c) were altered as given in Table 1. The results are given in Table 1.

EXAMPLE 9

To 100 parts by weight of the mixture comprising 76% by weight of SPS which had been produced in Preparation Example 1 (weight-average molecular weight of 320,000, weight-average molecular weight Mw/number-average molecular weight Mn of 2.60) as the component (a), 20% by weight of SEBS with a hydrogenation rate of 75 mol % (produced by Kuraray Co., Ltd. under the tradename "Septon KL-8006", reduced in hydrogenation rate) as the component (b), and 4% by weight of poly(2,6-dimethyl-1,4-phenylene ether)($[\eta]$=0.55 dL/g in chloroform at 25° C.) as the component (d), were added 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis[methylene-3-(3',5'-di-tert-butyl-4'-hydroxyphenyl)]propionate (produced by Adeka Argus Co., Ltd. under the tradename "MARK A060") also as an antioxidant, and the resultant mixture was dry-blended with a Henschel mixer. Subsequently the blend was melt kneaded and pelletized with a twin-screw extruder. The pellet thus obtained was injection molded to produce test pieces for Izod impact test. Measurements were made of Izod impact strength according to JIS-K-7110 before and after heat resistance test (120° C., 500 hours) and change in color tone of the test pieces thus obtained. The results are given in Table 1.

EXAMPLES 10 & 11 AND COMPARATIVE EXAMPLES 9 TO 11

The procedure in Example 9 was repeated except that the component (b) was altered as given in Table 1. The results are given in Table 1.

EXAMPLE 12

To 100 parts by weight of the mixture comprising 76% by weight of SPS which had been produced in Preparation Example 1 (weight-average molecular weight of 320,000, weight-average molecular weight Mw/number-average molecular weight Mn of 2.60) as the component (a), 4% by weight of SEBS with a hydrogenation rate of 75 mol % (produced by Kuraray Co., Ltd. under the tradename "Septon KL-8006", reduced in hydrogenation rate) as the component (b), 16% by weight of styrene/butadiene/styrene hydrogenated copolymer (produced by Shell Kagaku K. K. under the tradename "Kraton G-1651") as the component (c), and 4% by weight of poly(2,6-dimethyl-1,4-phenylene ether)($[\eta]$=0.55 dL/g in chloroform at 25° C.) as the component (d), were added 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis-[methylene-3-(3',5'-di-tert-butyl-4'-hydroxyphenyl)]propionate (produced by Adeka Argus co., Ltd. under the tradename "MAEK A060") also as an antioxidant, and the resultant mixture was dry-blended with a Henschel mixer. Subsequently the blend was melt kneaded and pelletized with a twin-screw extruder. The pellet thus obtained was injection molded to produce test pieces for Izod impact test.

Measurements were made of Izod impact strength according to JIS-K-7110 before and after heat resistance test (120° C., 500 hours) and change in color tone of the test pieces thus obtained. The results are given in Table 1.

EXAMPLES 13 TO 16 AND COMPARATIVE EXAMPLES 12 TO 16

The procedure in Example 12 was repeated except that the component (b) and component (c) were altered as given in Table 1. The results are given in Table 1.

The following is legend for the component (c) in Table 1.

G1651: SEBS, produced by Shell Chem. Co.
EP07P: EPM, produced by Japan Synthetic Rubber Co., Ltd.
E100G: PP, produced by Idemitsu Petrochemical Co., Ltd.

TABLE 1

| | Blending | | | | | | Heat resistance test (120° C., 500 hours) | | |
|---|---|---|---|---|---|---|---|---|---|
| | Component (a) SPS in Preparation Example 1 | Component (b) Styrene/diolefin copolymer with 70 to 80 mol % hydrogenation rate | | Component (c) Olefin-containing rubber or polyolefin | | Component (d) Poly (phenylene ether) | Before test Izod impact | After test Izod impact | Visual change in color |
| | addition amount (% by weight) | hydro-genation rate (mol %) | addition amount (% by weight) | Grade nomen-clature | addition amount (% by weight) | addition amount (% by weight) | strength with notch (kJ/m$^2$) | strength with notch (kJ/m$^2$) | tone Best: 10 ↓ Worst: 1 |
| Example No. | | | | | | | | | |
| 1 | 80 | 75 | 20 | — | — | — | 15.1 | 9.2 | 7 |
| 2 | 80 | 85 | 20 | — | — | — | 13.6 | 9.5 | 8 |
| 3 | 80 | 95 | 20 | — | — | — | 13.0 | 9.9 | 8 |

TABLE 1-continued

| | Component (a) SPS in Preparation Example 1 | Component (b) Styrene/diolefin copolymer with 70 to 80 mol % hydrogenation rate | | Component (c) Olefin-containing rubber or polyolefin | | Component (d) Poly (phenylene ether) | Heat resistance test (120° C., 500 hours) | | |
|---|---|---|---|---|---|---|---|---|---|
| | addition amount (% by weight) | hydrogenation rate (mol %) | addition amount (% by weight) | Grade nomenclature | addition amount (% by weight) | addition amount (% by weight) | Before test Izod impact strength with notch (kJ/m²) | After test Izod impact strength with notch (kJ/m²) | Visual change in color tone Best: 10 ↓ Worst: 1 |
| 4 | 80 | 75 | 4 | G1651 | 16 | — | 13.7 | 9.9 | 9 |
| 5 | 80 | 75 | 4 | EP07P | 16 | — | 6.9 | 6.0 | 9 |
| 6 | 80 | 85 | 4 | EP07P | 16 | — | 6.5 | 5.9 | 9 |
| 7 | 80 | 95 | 4 | EP07P | 16 | — | 6.3 | 6.1 | 10 |
| 8 | 80 | 85 | 4 | B100G | 16 | — | 4.5 | 4.1 | 9 |
| 9 | 76 | 75 | 20 | — | — | 4 | 26.8 | 18.5 | 7 |
| 10 | 76 | 85 | 20 | — | — | 4 | 24.8 | 19.1 | 8 |
| 11 | 76 | 95 | 20 | — | — | 4 | 28.5 | 19.0 | 9 |
| 12 | 76 | 75 | 4 | G1651 | 16 | 4 | 21.0 | 18.5 | 9 |
| 13 | 76 | 75 | 4 | EP07P | 16 | 4 | 9.0 | 7.8 | 9 |
| 14 | 76 | 85 | 4 | EP07P | 16 | 4 | 8.5 | 7.5 | 9 |
| 15 | 76 | 95 | 4 | EP07P | 16 | 4 | 8.0 | 7.2 | 10 |
| 16 | 76 | 85 | 4 | E100G | 16 | 4 | 6.0 | 5.5 | 9 |
| Comp. Example No. | | | | | | | | | |
| 1 | 80 | 100 | 20 | — | — | — | 6.0 | 5.5 | 10 |
| 2 | 80 | 50 | 20 | — | — | — | 16.2 | 6.1 | 2 |
| 3 | 80 | 0 | 20 | — | — | — | 19.1 | 4.2 | 1 |
| 4 | 80 | 100 | 4 | G1651 | 16 | — | 5.9 | 5.3 | 10 |
| 5 | 80 | 100 | 4 | EP07P | 16 | — | 4.0 | 3.8 | 10 |
| 6 | 80 | 50 | 4 | EP07P | 16 | — | 7.1 | 3.5 | 3 |
| 7 | 80 | 0 | 4 | EP07P | 16 | — | 7.8 | 8.0 | 2 |
| 8 | 80 | 100 | 4 | E100G | 16 | — | 3.2 | 2.8 | 10 |
| 9 | 76 | 100 | 20 | — | — | 4 | 18.2 | 14.3 | 10 |
| 10 | 76 | 50 | 20 | — | — | 4 | 25.8 | 8.5 | 2 |
| 11 | 76 | 0 | 20 | — | — | 4 | 32.4 | 6.9 | 1 |
| 12 | 76 | 100 | 4 | G1651 | 16 | 4 | 17.0 | 14.1 | 10 |
| 13 | 76 | 100 | 4 | EP07P | 16 | 4 | 6.1 | 5.2 | 10 |
| 14 | 76 | 50 | 4 | EP07P | 16 | 4 | 9.3 | 4.9 | 3 |
| 15 | 76 | 0 | 4 | EP07P | 16 | 4 | 9.9 | 4.1 | 2 |
| 16 | 76 | 100 | 4 | E100G | 16 | 4 | 4.0 | 3.5 | 10 |

Remarks: Comp. Example; Comparative Example

As is clear from the results given in Table 1, by the use of the component (b) having a hydrogenation rate within the range of 70 to 98 mol % as a rubbery elastomer or as a compatibilizer for the component (c), it is made possible to remarkably enhance the impact resistance of the resin composition in comparison with the use of a component having a hydrogenation rate more than 98 mol % and also to markedly enhance the impact resistance and heat resistant stability of color tone with regard to the resin composition as compared with the use of a components having a hydrogenation rate less than 70 mol %. In addition, the use of the component (d) in combination with the component (a) and (b) enables the resin composition to be further enhanced in impact resistance.

EXAMPLE 17

To 100 parts by weight of the mixture comprising 90% by weight of SPS which had been produced in Preparation Example 1 (weight-average molecular weight of 320,000, weight-average molecular weight Mw/number-average molecular weight Mn of 2.60) as the component (a), and 10% by weight of SEBS with a hydrogenation rate of 75 mol % (produced by Kuraray Co., Ltd. under the tradename "Septon KL-8006", reduced in hydrogenation rate) as the component (b), were added 3 parts by weight of maleic anhydride modified SPS which had been produced in Preparation Example 3 as the component (f), 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis[methylene-3-(3',5'-di-tert-butyl-4'-hydroxyphenyl)] propionate (produced by Adeka Argus Co., Ltd. under the tradename "MARK A060") also as an antioxidant, and the resultant mixture was dry-blended with a Henschel mixer. Subsequently the blend was incorporated with 43 parts by weight of glass fiber (10 μm/3 mm, produced by Asahi Fiber Glass Co., Ltd. under the tradename "FT-712") by side feeding, as the component (e), melt kneaded and pelletized with a twin-screw extruder. The pellet thus obtained was injection molded to produce test pieces for Izod impact test. Measurements were made of Izod impact strength according to JIS-K-7110 before and after heat resistance test (150° C., 500 hours) and change in color tone of the test pieces. The components and blending ratios thereof are given in Table 2 and the test results are given in Table 3.

EXAMPLES 18 TO 22 AND COMPARATIVE EXAMPLES 17 TO 22

The procedure in Example 17 was repeated except that the component (b) was altered as given in Table 2 and that maleic anhydride modified poly(phenylene ether) that had been produced in Preparation Example 4 was used as the component (f). The results are given in Table 3.

EXAMPLE 23

To 100 parts by weight of the mixture comprising 90% by weight of SPS which had been produced in Preparation Example 1 (weight-average molecular weight of 320,000, weight-average molecular weight Mw/number-average molecular weight Mn of 2.60) as the component (a), 2% by weight of SEBS with a hydrogenation rate of 75 mol % (produced by Kuraray Co., Ltd. under the tradename "Septon KL-8006", reduced in hydrogenation rate) as the component (b) and 8% by weight of styrene/butadiene/styrene hydrogenated copolymer (produced by shell Kagaku K. K. under the tradename "Kraton G-1651") as the component (c), were added 3 parts by weight of maleic anhydride modified poly(phenylene ether) which had been produced in Preparation Example 4 as the component (f), 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis[methylene-3-(3',5'-di-tert-butyl-4'-hydroxyphenyl)]propionate (produced by Adeka Argus Co., Ltd. under the tradename "MARK A060") also as an antioxidant, and the resultant mixture was dry-blended with a Henschel mixer. Subsequently the blend was incorporated with 43 parts by weight of glass fiber (10 $\mu$m/3 mm, produced by Asahi Fiber Glass Co., Ltd. under the tradename "FT-712") by side feeding, as the component (e), melt kneaded and pelletized with a twin-screw extruder. The pellet thus obtained was injection molded to produce test pieces for Izod impact test. Measurements were made of Izod impact strength according to JIS-K-7110 before and after heat resistance test (150° C., 500 hours) and change in color tone of the test pieces thus obtained. The components and blending ratios thereof are given in Table 2 and the test results are given in Table 3.

EXAMPLES 24 TO 27 AND COMPARATIVE EXAMPLES 23 TO 27

The procedure in Example 23 was repeated except that the component (b) and the component (c) were altered as given in Table 2. The results are given in Table 3.

EXAMPLE 28

To 100 parts by weight of the mixture comprising 88% by weight of SPS which had been produced in Preparation Example 1 (weight-average molecular weight of 320,000, weight-average molecular weight Mw/number-average molecular weight Mn of 2.60) as the component (a), 10% by weight of SEBS with a hydrogenation rate of 75 mol % (produced by Kuraray Co., Ltd. under the tradename "Septon KL-8006", reduced in hydrogenation rate) as the component (b), and 2% by weight of poly(2,6-dimethyl-1,4-phenylene ether) ([$\eta$]=0.55 dL/g in chloroform at 25° C.) as the component (d), were added 3 parts by weight of maleic anhydride modified poly(phenylene ether) which had been produced in Preparation Example 4 as the component (f), 0.1 part by weight of (2,6-di-tert-butyl-4-methylphenyl) pentaerythritol diphosphite (produced by Adeka Argus Co., Ltd. under the tradename "PEP-36") as an antioxidant and 0.1 part by weight of tetrakis[methylene-3-(3',5'-di-tert-butyl-4'-hydroxyphenyl)]propionate (produced by Adeka Argus Co., Ltd. under the tradename "MARK A060") also as an antioxidant, and the resultant mixture was dry-blended with a Henschel mixer. Subsequently the blend was incorporated with 43 parts by weight of glass fiber (10 $\mu$m/3 mm, produced by Asahi Fiber Glass Co., Ltd. under the tradename "FT-712") by side feeding, as the component (e), melt kneaded and pelletized with a twin-screw extruder. The pellet thus obtained was injection molded to produce test pieces for Izod impact test. Measurements were made of Izod impact strength according to JIS-K-7110 before and after heat resistance test (150° C., 500 hours) and change in color tone of the test pieces thus obtained. The components and blending ratios thereof are given in Table 2 and the test results are given in Table 3.

EXAMPLES 29 & 30 AND COMPARATIVE EXAMPLES 28 TO 30

The procedure in Example 28 was repeated except that the component (b) was altered as given in Table 2. The results are given in Table 3.

EXAMPLE 31

To 100 parts by weight of the mixture comprising 88% by weight of SPS which had been produced in Preparation Example 1 (weight-average molecular weight of 320,000, weight-average molecular weight Mw/number-average molecular weight Mn of 2.60) as the component (a), 2% by weight of SEBS with a hydrogenation rate of 75 mol % (produced by Kuraray Co., Ltd. under the tradename "Septon KL-8006", reduced in hydrogenation rate) as the component (b), 8% by weight of styrene/butadiene/styrene hydrogenated copolymer (produced by Shell Kagaku K. K. under the tradename "Kraton G-1651") as the component (c), and 2% by weight of poly(2,6-dimethyl-1,4-phenylene ether)([$\eta$]=0.55 dL/g in chloroform at 25° C.) as the component (d), were added 3 parts by weight of maleic anhydride modified poly(phenylene ether) which had been produced in Preparation Example 4 as the component (f), 0.1 part by weight of (2,6-di-tert-butyl-4-methylphenyl) pentaerythritol diphosphite (produced by Adeka Argus Co., Ltd. under the tradename "PEP-36) as an antioxidant and 0.1 part by weight of tetrakis[methylene-3-(3',5'-di-tert-butyl-4'-hydroxyphenyl)]propionate (produced by Adeka Argus Co., Ltd. under the tradename "MARK A060") also as an antioxidant, and the resultant mixture was dry-blended with a Henschel mixer. Subsequently the blend was incorporated with 43 parts by weight of glass fiber (10 $\mu$m/3 mm, produced by Asahi Fiber Glass Co., Ltd. under the tradename "FT-712") by side feeding, as the component (e), melt kneaded and pelletized with a twin-screw extruder. The pellet thus obtained was injection molded to produce test pieces for Izod impact test. Measurements were made of Izod impact strength according to JIS-K-7110 before and after heat resistance test (150° C., 500 hours) and change in color tone of the test pieces thus obtained. The components and blending ratios thereof are given in Table 2 and the test results are given in Table 3.

EXAMPLES 32 TO 35 AND COMPARATIVE EXAMPLES 31 TO 35

The procedure in Example 31 was repeated except that the component (b) and component (c) were altered as given in Table 2. The results are given in Table 3.

TABLE 2

| Example No. | Component (a) SPS in Preparation Example 1 addition amount (% by weight) | Component (b) Styrene/diolefin copolymer with 70 to 80 mol % hydrogenation rate - hydrogenation rate (mol %) | Component (b) addition amount (% by weight) | Component (c) Olefin-containing rubber or polyolefin - Grade nomenclature | Component (c) addition amount (% by weight) | Component (d) Poly (phenylene ether) addition amount (% by weight) | Component (e) Glass fiber addition amount (% by weight) | Component (f) Modified SPS or modified PPO - Preparation Example | Component (f) addition amount (% by weight) |
|---|---|---|---|---|---|---|---|---|---|
| 17 | 90 | 75 | 10 | — | — | — | 48 | 3 | 3 |
| 18 | 90 | 85 | 10 | — | — | — | 43 | 3 | 3 |
| 19 | 90 | 95 | 10 | — | — | — | 43 | 3 | 3 |
| 20 | 90 | 75 | 10 | — | — | — | 43 | 4 | 3 |
| 21 | 90 | 85 | 10 | — | — | — | 43 | 4 | 3 |
| 22 | 90 | 95 | 10 | — | — | — | 43 | 4 | 3 |
| 23 | 90 | 85 | 2 | G1651 | 8 | — | 43 | 4 | 3 |
| 24 | 90 | 75 | 2 | EP07P | 8 | — | 43 | 4 | 3 |
| 25 | 90 | 85 | 2 | EP07P | 8 | — | 43 | 4 | 3 |
| 26 | 90 | 95 | 2 | EP07P | 8 | — | 43 | 4 | 3 |
| 27 | 90 | 85 | 2 | E100G | 8 | — | 43 | 4 | 3 |
| 28 | 88 | 75 | 10 | — | — | 2 | 43 | 4 | 3 |
| 29 | 88 | 85 | 10 | — | — | 2 | 43 | 4 | 3 |
| 30 | 88 | 95 | 10 | — | — | 2 | 43 | 4 | 3 |
| 31 | 88 | 85 | 2 | G1651 | 8 | 2 | 43 | 4 | 3 |
| 32 | 88 | 75 | 2 | EP07P | 8 | 2 | 43 | 4 | 3 |
| 33 | 88 | 85 | 2 | EP07P | 8 | 2 | 43 | 4 | 3 |
| 34 | 88 | 95 | 2 | EP07P | 8 | 2 | 43 | 4 | 3 |
| 35 | 88 | 85 | 2 | E100G | 8 | 2 | 43 | 4 | 3 |
| Comp. Example No. | | | | | | | | | |
| 17 | 90 | 100 | 10 | — | — | — | 43 | 3 | 3 |
| 18 | 90 | 50 | 10 | — | — | — | 43 | 3 | 3 |
| 19 | 90 | 0 | 10 | — | — | — | 43 | 3 | 3 |
| 20 | 90 | 100 | 10 | — | — | — | 43 | 4 | 3 |
| 21 | 90 | 50 | 10 | — | — | — | 43 | 4 | 3 |
| 22 | 90 | 0 | 10 | — | — | — | 43 | 4 | 3 |
| 23 | 90 | 100 | 2 | G1651 | 8 | — | 43 | 4 | 3 |
| 24 | 90 | 100 | 2 | EP07P | 8 | — | 43 | 4 | 3 |
| 25 | 90 | 50 | 2 | EP07P | 8 | — | 43 | 4 | 3 |
| 26 | 90 | 0 | 2 | EP07P | 8 | — | 43 | 4 | 3 |
| 27 | 90 | 100 | 2 | E100G | 8 | — | 43 | 4 | 3 |
| 28 | 88 | 100 | 10 | — | — | 2 | 43 | 4 | 3 |
| 29 | 88 | 50 | 10 | — | — | 2 | 43 | 4 | 3 |
| 30 | 88 | 0 | 10 | — | — | 2 | 43 | 4 | 3 |
| 31 | 88 | 100 | 2 | G1651 | 8 | 2 | 43 | 4 | 3 |
| 32 | 88 | 100 | 2 | EP07P | 8 | 2 | 43 | 4 | 3 |
| 33 | 88 | 50 | 2 | EP07P | 8 | 2 | 43 | 4 | 3 |
| 34 | 88 | 0 | 2 | EP07P | 8 | 2 | 43 | 4 | 3 |
| 35 | 88 | 100 | 2 | E100G | 8 | 2 | 43 | 4 | 3 |

TABLE 3

| | Heat resistance test (150° C., 500 hours) | | |
|---|---|---|---|
| Example No. | Before test Izod impact strength with notch (kJ/m$^2$) | After test Izod impact strength with notch (kJ/m$^2$) | Visual change in color tone Best:10 ↓ Worst:1 |
| 17 | 10.5 | 10.0 | 8 |
| 18 | 10.2 | 9.8 | 8 |
| 19 | 9.9 | 9.5 | 9 |
| 20 | 12.0 | 11.3 | 8 |
| 21 | 11.8 | 11.4 | 8 |
| 22 | 11.5 | 11.1 | 9 |
| 23 | 11.4 | 11.0 | 10 |

TABLE 3-continued

Heat resistance test (150° C., 500 hours)

| | Before test Izod impact strength with notch (kJ/m²) | After test Izod impact strength with notch (kJ/m²) | Visual change in color tone Best:10 ↓ Worst:1 |
|---|---|---|---|
| 24 | 9.5 | 8.8 | 9 |
| 25 | 9.5 | 8.7 | 10 |
| 26 | 9.4 | 8.7 | 10 |
| 27 | 8.9 | 8.3 | 10 |
| 28 | 12.9 | 12.1 | 8 |
| 29 | 12.8 | 12.2 | 8 |
| 30 | 12.6 | 12.0 | 8 |
| 31 | 12.4 | 12.0 | 9 |
| 32 | 10.3 | 9.8 | 9 |
| 33 | 10.2 | 9.6 | 9 |
| 34 | 10.0 | 9.6 | 10 |
| 35 | 9.7 | 9.3 | 9 |
| Comp. Example No. | | | |
| 17 | 9.1 | 8.8 | 10 |
| 18 | 10.7 | 6.1 | 4 |
| 19 | 10.9 | 5.5 | 2 |
| 20 | 10.8 | 9.9 | 10 |
| 21 | 12.3 | 7.0 | 3 |
| 22 | 12.6 | 5.8 | 1 |
| 23 | 10.6 | 9.8 | 10 |
| 24 | 8.9 | 8.3 | 10 |
| 25 | 9.7 | 6.1 | 4 |
| 26 | 9.9 | 5.8 | 2 |
| 27 | 8.0 | 7.5 | 10 |
| 28 | 11.8 | 11.2 | 9 |
| 29 | 13.1 | 7.8 | 2 |
| 30 | 13.3 | 6.2 | 1 |
| 31 | 11.7 | 11.1 | 10 |
| 32 | 9.4 | 8.9 | 10 |
| 33 | 10.4 | 6.9 | 4 |
| 34 | 10.6 | 6.4 | 2 |
| 35 | 8.8 | 8.2 | 10 |

As is clear from the results given in Table 3, by the use of the component (b) having a hydrogenation rate within the range of 70 to 98 mol % as a rubbery elastomer or as a compatibilizer for the component (c) in the composition further comprising an inorganic filler, it is made possible to remarkably enhance the impact strength of the resin composition in comparison with the use of a component having a hydrogenation rate more than 98 mol %, and also to markedly enhance the impact strength and heat resistant stability of color tone for the resin composition as compared with the use of a component having a hydrogenation rate less than 70 mol %. In addition, the use of the component (d) in combination with the components (a) and (b) enables the resin composition to be further enhanced in impact strength.

What is claimed is:

1. An impact resistant polystyrene composition which comprises 5 to 98% by weight of an (a) styrenic polymer having a syndiotactic configuration and 2 to 95% by weight of a (b) copolymer selected from the group consisting of a styrene/diolefin diblock copolymer, a styrene/diolefin/styrene triblock copolymer and a styrene/diolefin random copolymer, said copolymers each having a degree of hydrogenation in the range of 75 to less than 95 mol %.

2. The impact resistant polystyrene composition according to claim 1, which further comprises an (e) inorganic filler in an amount of 0.5 to 350 parts by weight based on 100 parts by weight of said polystyrene composition as set forth in claim 1.

3. The impact resistant polystyrene composition according to claim 1, which further comprises an (e) inorganic filler in an amount of 0.5 to 350 parts by weight and a (f) polymer which has compatibility with or affinity for said component (a) and further contains a polar group, each based on 100 parts by weight of said polystyrene composition as set forth in claim 1.

4. The impact resistant polystyrene composition according to claim 3, wherein the component (f) is at least one polymer selected from the group consisting of a modified styrenic polymer having a syndiotactic configuration and a modified poly(phenylene ether).

5. The impact resistant polystyrene composition according to claim 1, wherein the component (b) is at least one copolymer selected from the group consisting of a styrene/butadiene diblock copolymer, a styrene/isoprene diblock copolymer, a styrene/butadiene/styrene triblock copolymer, a styrene/isoprene/styrene triblock copolymer, a styrene/butadiene random copolymer and a styrene/isoprene random copolymer, said copolymers each having a degree of hydrogenation in the range of 75 to 95 mol %.

6. The impact resistant polystyrene composition according to claim 1, wherein the component (c) is at least one polymer selected from the group consisting of a hydrogenated styrene/butadiene/styrene copolymer, an ethylene/propylene copolymer, an ethylene/propylene/diolefin copolymer, polypropylene and polyethylene.

7. An impact resistant polystyrene composition which comprises 5 to 98% by weight of a (a) styrenic polymer having a syndiotactic configuration, a (b) copolymer selected from the group consisting of a styrene/diolefin/ diblock copolymer, a styrene/diolefin/styrene triblock copolymer and a styrene/diolefin random copolymer, said copolymers each having a degree of hydrogenation in the range of 75 to less than 95 mole % and a (c) component of at least one polymer selected from the group consisting of natural rubber, polybutadiene, polyisoprene, polyisobutylene, neoprene, styrene/butadiene block copolymer, styrene/butadiene/styrene block copolymer, hydrogenated styrene/butadiene/styrene block copolymer, styrene/isoprene block/styrene block copolymer, hydrogenated styrene/isoprene block/styrene block copolymer, ethylene/propylene/diene rubber and a polyolefin, the total amount of the component (b) and component (c) ranging from 2 to 95% by weight.

8. The impact resistant polystyrene composition according to claim 7, wherein the amount of component (b) is 2 to 20% by wt based on the total amount of components (a), (b) and (c).

9. An impact resistant polystyrene composition which comprises 5 to 98% by weight of a (a) styrenic polymer having a syndiotactic configuration, a (b) copolymer selected from the group consisting of a styrene/diolefin diblock copolymer, a styrene/diolefin/styrene triblock copolymer and a styrene/diolefin random copolymer, said copolymers each having a degree of hydrogenation in the range of 75 to less than 95 mole %, a component (c) which is at least one polymer selected from the group consisting of natural rubber, polybutadiene, polyisoprene, polyisobutylene, neoprene, styrene/butadiene block copolymer, styrene/butadiene/styrene block copolymer, hydrogenated styrene/butadiene/styrene block copolymer, styrene/isoprene block/styrene block copolymer, hydrogenated styrene/isoprene block/styrene block copolymer, ethylene/propylene/diene rubber and a polyolefin, the total amount of the component (b) and component (c) ranging from 1 to 90% by weight, and 0.5 to 5% by weight of a (d) poly(phenylene ether).

10. The impact resistant polystyrene composition according to claim 9, wherein the amount of component (b) is 2 to 20% by wt based on the total amount of components (a), (b), (c) and (d).

11. An impact resistant polystyrene composition which comprises 5 to 98% by weight of an (a) styrenic polymer having a syndiotactic configuration, 1 to 90% by weight of a (b) copolymer selected from the group consisting of a styrene/diolefin diblock copolymer, a styrene/diolefin/styrene triblock copolymer and a styrene/diolefin random copolymer, said copolymers each having a degree of hydrogenation in the range of 75 to less than 95 mol %, and 0.5 to 5% by weight of a (d) poly(phenylene ether).

* * * * *